Figure 1:
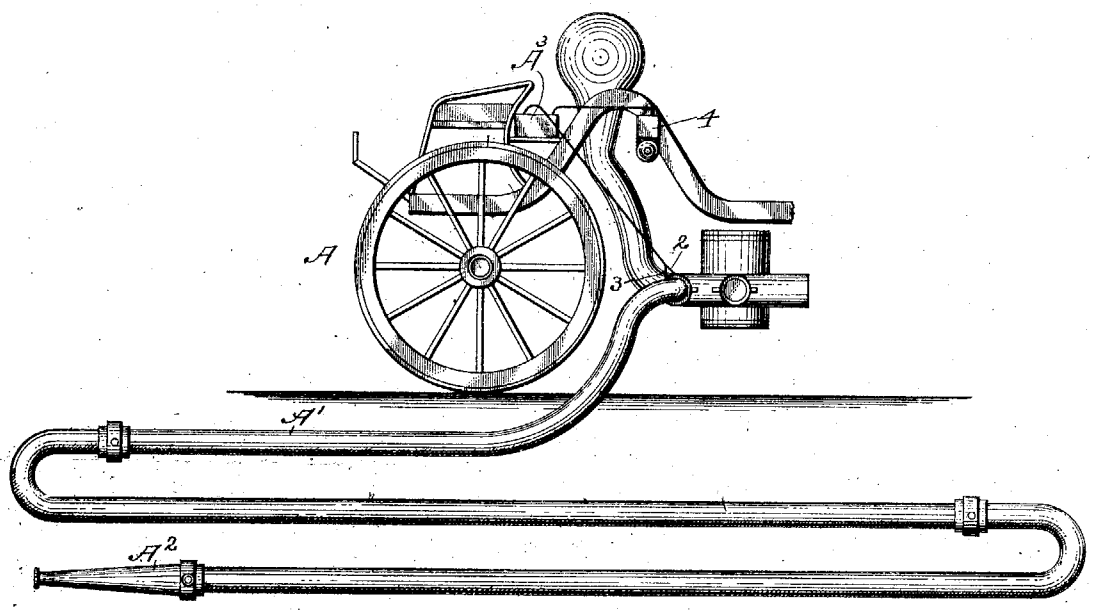

BEST AVAILABLE COPY

No. 11,924. Reissued July 30, 1901.

H. SARGENT.

ELECTRIC HOSE SIGNAL SYSTEM.

(Application filed Jan. 7, 1901.)

2 Sheets—Sheet 1.

WITNESSES:
Ellen F. Collins
Chas. C. Barton Jr.

INVENTOR:
Howard Sargent,
by his attorney,
E. G. Bradwick

BEST AVAILABLE COPY

No. 11,924. Reissued July 30, 1901.

H. SARGENT.

ELECTRIC HOSE SIGNAL SYSTEM.

(Application filed Jan. 7, 1901.)

2 Sheets—Sheet 2.

WITNESSES:
Ellen F. Collins
Charles C. Barton Jr

INVENTOR:
Howard Sargent,
by his attorney,
E. D. Bradwick

BEST AVAILABLE COPY

UNITED STATES PATENT OFFICE.

HOWARD SARGENT, OF BOSTON, MASSACHUSETTS, ASSIGNOR TO THE BOSTON ELECTRIC HOSE SIGNAL CO., OF SAME PLACE.

ELECTRIC HOSE SIGNAL SYSTEM.

SPECIFICATION forming part of Reissued Letters Patent No. 11,924, dated July 30, 1901.

Original No. 621,654, dated March 28, 1899. Application for reissue filed January 7, 1901. Serial No. 42,445.

*To all whom it may concern:*

Be it known that I, HOWARD SARGENT, residing in Boston, county of Suffolk, State of Massachusetts, have invented an Improvement in Electric Hose Signal Systems, of which the following description, in connection with the accompanying drawings, is a specification, like letters and numerals on the drawings representing like parts.

In electric hose signal systems it has been customary to provide a line of hose with wires running along the hose and with couplings having circuit terminals or connections, whereby when the parts thereof are screwed together a continuous circuit is formed the entire length of the line of hose, and a circuit-operating device has been provided on the nozzle, which is within easy reach of the hoseman for operating said circuit, and a battery and an alarm have been located on the engine.

In the system as generally constructed the couplings themselves have been included in and formed part of the circuit, and the coupling which is used to connect the line of hose with the engine has been made just the same as the couplings which connect together the sections of hose and form the line, and as a result the engine has been included in and thereby forms a part of the circuit at one side of the battery, which in practice has been found to be very objectionable and, in fact, under ordinary conditions totally impracticable, owing to the many opportunities for short-circuiting and grounding the signaling-circuit.

This invention has for its object to improve the construction of a hose signal system, to the end that the circuit will be entirely separate and independent from the engine, yet the couplings themselves may form a part of the circuit, and the circuit-wires and connections will be arranged along the line of hose, as usual, and said line of hose or any section of it may be connected with the engine.

In carrying out this invention I construct a coupling for connecting the line or section of hose with the engine in such manner that it will be completely insulated electrically from the engine, and such coupling is screwed onto the usual nipple of the engine and remains as a permanent fixture thereon, and it is adapted to receive any one of the other couplings of the line of hose.

As herein shown, the coupling consists of a shell having an internally-screw-threaded ring of hard rubber or other insulating material at the inner end, which is adapted to engage the usual nipple on the engine, and by reason of said ring being composed of insulating material said coupling will be completely insulated electrically from the engine. Two terminal wires are attached to said coupling, which are insulated from each other, and said terminal wires are connected to form a loop, and a battery and an alarm are located on the engine and included in said loop. The outer end of the coupling is formed to receive any usual coupling, and it has circuit-terminals which will engage and coöperate, respectively, with a coupling adapted to be received upon it and with a circuit-terminal carried thereby.

Figure 2:
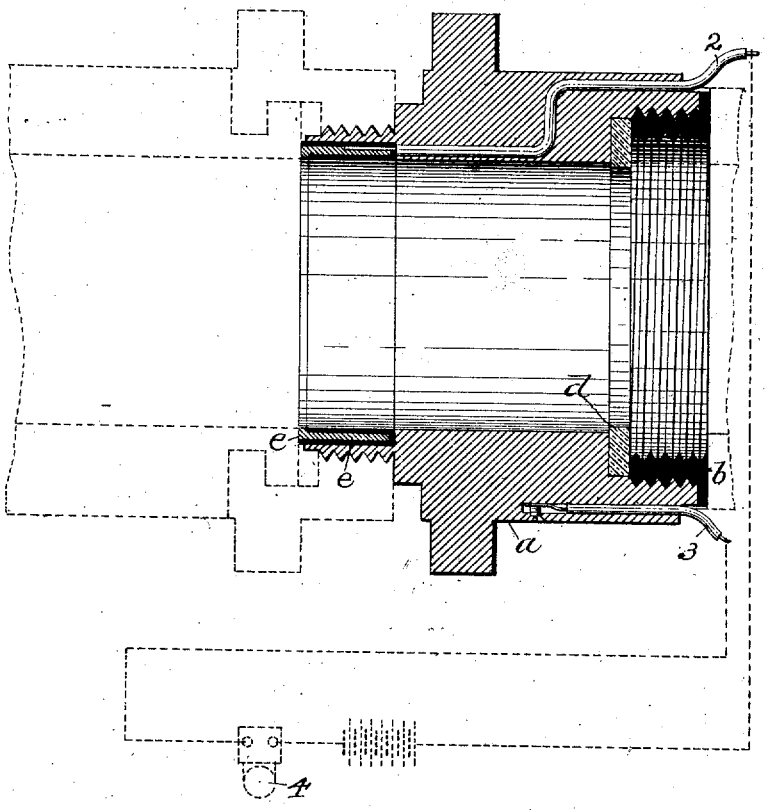

Figure 1 shows in side elevation a portion of a fire-engine and attached hose and hose signal apparatus embodying this invention. Fig. 2 shows a longitudinal section of a coupling embodying this invention for connecting the line of hose with the engine.

A represents a fire-engine, $A'$ the usual line of hose connected thereto, and $A^2$ the nozzle.

Circuit-wires (not shown) extend along the line of hose, and the couplings which connect together the sections of hose to form the line themselves form and are provided with circuit connections or terminals which connect said circuit-wires to form a continuous circuit, and on the hose-nozzle any suitable form of circuit-operating device is provided for operating the circuit thus formed.

A hose signal system so far described is of usual construction.

At the fire-engine two wires 2 3 lead from a coupling which connects the line of hose with the engine, and said wires 2 3 form a loop and, as herein shown, are insulated wires twisted or formed into a cable and contain a battery and a bell or other suitable alarm. The battery is herein represented as contained in the box $A^3$, and the bell is represented at 4. This loop 2 3, it will be seen, is absolutely free and independent from the en-

BEST AVAILABLE COPY gine, and the wires forming it lead directly from the coupling.

*a* represents the shell of the coupling, (see Fig. 2,) and *b* represents an internally-screw-threaded ring of hard rubber or other insulating material which is screwed into one end of said shell *a*, or it may be otherwise secured thereto. The insulating-ring *b* is adapted to engage the usual screw-threaded nipple *c* (see dotted lines, Fig. 2) on the engine. The insulating-ring *b* will preferably be screwed into the shell against a rubber packing-ring *d*. The shell *a* has at its opposite end a conducting-ring *e*, which is insulated from the shell, and one of the terminal wires, as 2, of the circuit extends along the shell *a* and is attached to said conducting-ring *e*, while the other terminal, as 3, of the circuit is attached directly to the shell, as shown.

The conducting-ring *e*, which is connected with, but insulated from, the shell *a*, is adapted to coöperate with a similar ring on a coupling on the line of hose to complete the circuit connections; but such a ring, together with its coöperating parts, is shown in my United States Patent No. 499,254, dated June 13, 1893.

It will be seen that by means of the coupling herein shown the line of hose may be connected with the engine in the usual manner, so far as manipulating the couplings is concerned, but will be electrically insulated therefrom, and that consequently the loop 2 3, containing the battery and alarm, will be absolutely free and independent of the engine, which latter at no time forms a part of the circuit.

The coupling thus described when connected with the engine will remain as a permanent fixture thereon to receive any usual coupling provided with circuit-terminals that may be adapted to be received upon it.

I claim—

1. In an electric hose signal system, a coupling for connecting a line of hose with the engine, comprising two contact-pieces insulated from each other and adapted respectively to make contact with the hose-coupling and with an insulated circuit-terminal carried thereby, an insulating-ring interposed between said contact-pieces and the engine, and circuit-wires connected to said contact-pieces respectively and forming a loop which includes a battery and a signaling device, for the purpose set forth.

2. In an electric hose signal system, a coupling for connecting a line of hose with the engine, having an internally-screw-threaded ring of insulating material at one end which engages a screw-threaded nipple on the engine, and having two circuit-wires attached to it but insulated from each other, which are connected to form a loop, and a battery and bell included in said loop, substantially as described.

3. In an electric hose signal system, a coupling for connecting a line of hose with the engine having as a coöperative part of it a conducting-shell provided at one end with an internally-screw-threaded ring of insulating material which engages a nipple on the engine, and provided at the outer end with a conducting-ring insulated from the shell, a circuit-wire extending along the shell and connected with said conducting-ring, and a circuit-wire attached directly to said shell, said circuit-wires being thereby insulated from each other, and connected to form a loop independent of the engine, and an alarm in said loop, substantially as described.

4. In an electric hose signal system, a line of hose having a nozzle, couplings and circuit-wires along its length, and a terminal coupling, each line-coupling adapted to connect the circuit-wires as the hose-sections are joined, and the terminal coupling comprising a body portion or shell attached to and carried by the hose, an inner insulated ring carried by said body or shell, said shell and the insulated ring constituting the terminals of the electric circuit, a double screw-threaded coupling-ring of insulating material fitted to the shell, and adapted to at a nipple on the engine, a source of current and a signal connected through the shell and ring to the circuit-wires, and a suitable circuit-closer, substantially as described.

In testimony whereof I have signed my name to this specification in the presence of two subscribing witnesses.

HOWARD SARGENT.

Witnesses:
MARTHA L. SARGENT,
E. D. CHADWICK.